US012359635B2

(12) United States Patent
Kleine

(10) Patent No.: US 12,359,635 B2
(45) Date of Patent: Jul. 15, 2025

(54) METHOD FOR OPERATING AN INTERNAL COMBUSTION ENGINE OF A MOTOR VEHICLE, AND MOTOR VEHICLE

(71) Applicant: Bayerische Motoren Werke Aktiengesellschaft, Munich (DE)

(72) Inventor: Nikita Kleine, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/564,777

(22) PCT Filed: Jun. 24, 2022

(86) PCT No.: PCT/EP2022/067291

§ 371 (c)(1),
(2) Date: Nov. 28, 2023

(87) PCT Pub. No.: WO2023/001486

PCT Pub. Date: Jan. 26, 2023

(65) Prior Publication Data

US 2024/0271583 A1 Aug. 15, 2024

(30) Foreign Application Priority Data

Jul. 23, 2021 (DE) ..................... 10 2021 119 173.4

(51) Int. Cl.
*F02D 41/02* (2006.01)
*F02D 41/14* (2006.01)

(52) U.S. Cl.
CPC ..... *F02D 41/0235* (2013.01); *F02D 41/1445* (2013.01); *F02D 41/1446* (2013.01); *F02D 2200/0808* (2013.01)

(58) Field of Classification Search
CPC ............. F02D 41/0235; F02D 41/1445; F02D 41/1446; F02D 2200/0808
See application file for complete search history.

(56) References Cited

U.S. PATENT DOCUMENTS 8,883,102 B1 11/2014 Lambert et al.
11,933,206 B2 * 3/2024 Zein ...................... F01N 11/005
(Continued)

FOREIGN PATENT DOCUMENTS

DE 103 05 541 A1 7/2004
DE 10 2015 100 047 A1 7/2015
(Continued)

OTHER PUBLICATIONS

International Search Report (PCT/ISA/210) issued in PCT Application No. PCT/EP2022/067291 dated Aug. 31, 2022 with English translation (4 pages).
(Continued)

*Primary Examiner* — Kurt Philip Liethen
(74) *Attorney, Agent, or Firm* — Crowell & Moring LLP

(57) ABSTRACT

A method is disclosed for operating an internal combustion engine of a motor vehicle in which exhaust gas from the internal combustion engine is fed to at least one catalytic converter in an emission control system of the motor vehicle. A power that the internal combustion engine can supply is adjusted via a control device of the motor vehicle as a function of an emission of at least one pollutant contained in the exhaust gas into an environment of the motor vehicle. A quantity of a volumetric percentage of the at least one catalytic converter causing the at least one pollutant to be converted is ascertained, and the power supplied by the internal combustion engine is adjusted as a function of said quantity of the volumetric percentage.

9 Claims, 2 Drawing Sheets

(56) References Cited

U.S. PATENT DOCUMENTS

| | | | | |
|---|---|---|---|---|
| 2002/0144501 | A1 * | 10/2002 | Uedahira | F02D 41/005 60/277 |
| 2014/0032189 | A1 * | 1/2014 | Hehle | G16C 10/00 703/2 |
| 2014/0072477 | A1 | 3/2014 | Gonze et al. | |
| 2017/0342924 | A1 | 11/2017 | Gwidt et al. | |
| 2019/0360416 | A1 | 11/2019 | Nee | |
| 2020/0109679 | A1 * | 4/2020 | Knopp | F02D 41/1456 |
| 2021/0215076 | A1 | 7/2021 | Ellmer | |

FOREIGN PATENT DOCUMENTS

| | | | | |
|---|---|---|---|---|
| DE | 10 2017 111 316 | A1 | 11/2017 | |
| DE | 102019128234 | A1 * | 12/2019 | F01N 3/10 |
| DE | 10 2019 205 128 | A1 | 4/2020 | |
| DE | 10 2019 203 798 | A1 | 9/2020 | |
| EP | 3 572 634 | A1 | 11/2019 | |

OTHER PUBLICATIONS

German-language Written Opinion (PCT/ISA/237) issued in PCT Application No. PCT/EP2022/067291 dated Aug. 31, 2022 with English translation (12 pages).

German Search Report issued in German Application No. 10 2021 119 173 dated Dec. 1, 2021 with partial English translation (11 pages).

* cited by examiner

METHOD FOR OPERATING AN INTERNAL COMBUSTION ENGINE OF A MOTOR VEHICLE, AND MOTOR VEHICLE

BACKGROUND AND SUMMARY

This disclosure relates to a method for operating an internal combustion engine of a motor vehicle, in which exhaust gas from the internal combustion engine is fed to at least one catalytic converter arranged in an exhaust system of the motor vehicle. Power which can be supplied by the internal combustion engine is set via a control device of the motor vehicle as a function of an emission of at least one pollutant contained in the exhaust gas into the surroundings of the motor vehicle. The disclosure furthermore relates to a motor vehicle with an internal combustion engine.

DE 10 2019 203 798 A1 describes emissions-based control of an internal combustion engine. In DE 10 2019 203 798 A1, the power of the internal combustion engine is decreased in order to keep nitrogen oxide emissions of the internal combustion engine below a threshold value. The power of the internal combustion engine is also decreased when the temperature of a catalytic converter arranged in an exhaust tract of the internal combustion engine is outside a certain temperature window.

It is however considered a disadvantage that because of the decrease in the power of the internal combustion engine, the full power of the internal combustion engine is not available to drive the motor vehicle.

Furthermore, because of the emissions regulations currently in force in Europe and under boundary conditions which take into account the emissions which actually occur (RDE, real driving emissions) when a motor vehicle is being driven, the power of an internal combustion engine can be limited or decreased. This is the case in particular when, after a cold start of the internal combustion engine of the vehicle or motor vehicle, the internal combustion engine is operating under full load without a catalytic converter, arranged in an exhaust system of the motor vehicle, having been heated sufficiently when the internal combustion engine is idling. When, on the other hand, the internal combustion engine has been idling to a sufficient extent during the cold start, the exhaust system and in particular the at least one catalytic converter arranged in the exhaust system of the motor vehicle can be heated during this idling phase, in particular by increasing a torque reserve when the internal combustion engine is idling.

If, after the at least one catalytic converter has been heated, load is then requested from the internal combustion engine by the driver, the emissions from the internal combustion engine can be converted relatively reliably via the at least one catalytic converter in the case of high exhaust gas mass flows. If, however, there is an insufficient amount of idling, there is also insufficient time to heat the at least one catalytic converter. If the catalytic converter has not yet reached its full conversion capacity, the catalytic converter cannot convert all of the emissions from the internal combustion engine when under full load, and thus with a maximum exhaust gas mass flow. So-called overrun of the catalytic converter can occur, i.e., the escape of emissions such that these emissions can pass into the surroundings of the motor vehicle in the form of unconverted pollutants.

In particular in order to comply with emissions threshold values in the case of an extreme driving maneuver such as, for example, starting of the internal combustion engine and subsequent operating of the internal combustion engine under full load, the power of the internal combustion engine may be limited when the motor vehicle accelerates under full load after a cold start of the internal combustion engine without a sufficient amount of idling to heat up the catalytic converter. This can be achieved by capping the torque of the internal combustion engine and the speed of the internal combustion engine. Such a strategy of limiting the power which can be supplied by the internal combustion engine is based on the recognition that such extreme driving maneuvers are absolutely possible and therefore need to be taken into account in the context of the legislation relating to the real driving emissions of the motor vehicle. i.e. the RDE legislation.

Such limitation of the power of the internal combustion engine taking into account the emission of pollutants into the surroundings of the motor vehicle results, however, in a loss of driving comfort for a driver of the motor vehicle.

An object of this disclosure is to provide an improved method of the type mentioned above, and a motor vehicle designed to perform such a method.

In a method according to the disclosure for operating an internal combustion engine of a motor vehicle, exhaust gas from the internal combustion engine is fed to at least one catalytic converter arranged in an exhaust system of the motor vehicle. Power which can be supplied by the internal combustion engine is set by means of a control device of the motor vehicle as a function of an emission of at least one pollutant contained in the exhaust gas into the surroundings of the motor vehicle. In the method, the size of a partial volume, effecting the conversion of the at least one pollutant, of the at least one catalytic converter is calculated. The power which can be supplied by the internal combustion engine is set as a function of the respective size of the partial volume. Accordingly, when adjusting the power which can be supplied or output by the internal combustion engine, it is taken into account how large the partial volume of the catalytic converter is, which has already been activated, such that this partial volume effects the conversion of the at least one pollutant.

This is based on the recognition that, as soon as a small-sized partial volume is capable of converting the at least one pollutant, the emissions discharged into the surroundings of the motor vehicle are reduced by the exhaust gas flowing through the at least one catalytic converter and thus also through the partial volume which has already been activated. Because the size of this partial volume is taken into account when setting the power which can be supplied by the internal combustion engine, it is possible for a relatively high power of the internal combustion engine to be released very early.

In particular, more power can be supplied early on, as compared to a method in which, for example, a limitation on the power of the internal combustion engine is lifted after a predetermined period of time has expired, or when a predetermined temperature of the catalytic converter has been reached. Consequently, the method is advantageous in particular in terms of very early release of an unlimited or at least less strictly limited power of the internal combustion engine.

The partial volume of the at least one catalytic converter which effects the conversion of the at least one pollutant can also be referred to as an active or activated partial volume of the at least one catalytic converter. This is because, in particular when this partial volume or a corresponding partial volume of a total volume of the at least one catalytic converter has reached an activation temperature or light-off temperature, a significant conversion of the at least one pollutant is achieved via the at least one catalytic converter.

In other words, the activated partial volume is sufficiently heated in order to achieve a specific minimum conversion rate for the at least one pollutant.

The corresponding activated partial volume of the at least one catalytic converter can in particular be considered or described as effecting the conversion of the at least one pollutant when the conversion rate of the partial volume is, for example, 50% such that at least 50% of the at least one pollutant contained in the exhaust gas is converted via the catalytic converter.

The method is moreover based on the recognition that degradation or limitation of the power of the internal combustion engine which specifies a maximum speed and a maximum torque, for example after a cold start of the internal combustion engine, is hard-coded and thus not flexible. Such limitation thus does not take into account a current conversion capacity of the at least one catalytic converter or of a corresponding exhaust gas post-treatment device of the motor vehicle. Consequently, in the case of such an inflexible method, the power of the internal combustion engine is capped fixedly throughout the acceleration of the motor vehicle by an internal combustion engine operating under full load after a cold start.

In such a method, the user, in particular in the form of the driver of the motor vehicle, can therefore not call on power from the internal combustion engine in operating ranges in which the conversion capacity of the catalytic converter would actually permit the provision of a higher power of the internal combustion engine. These disadvantages can be overcome via the method in which the size of the already activated partial volume of the catalytic converter is taken into account for setting the power which can be supplied by the internal combustion engine.

Furthermore, the fixed inflexible specification of the limitation of the power of the internal combustion engine for a predetermined period of time or until a predetermined temperature of the at least one catalytic converter has been reached entails the risk that the limitation of the power falls to too low a level, under all boundary conditions, in order to comply with the emissions threshold values which are possible in particular taking into account the real driving emissions. This is problematic in particular in terms of more and more strict threshold values and higher and higher emissions requirements of internal combustion engines of motor vehicles, and in terms of the boundary conditions, such as those which are relevant for European Union regulations currently discussed, and which could possibly apply in the future.

The method in which the power which can be supplied by the internal combustion engine is set as a function of the respective size of the partial volume is advantageous, both when the motor vehicle takes the form of a motor vehicle powered exclusively by an internal combustion engine, and also when the motor vehicle takes the form of a hybrid vehicle, in particular a plug-in hybrid vehicle. In the case of a motor vehicle in the form of a hybrid vehicle, the internal combustion engine is used to assist an electric drive of the motor vehicle and/or to charge an electrical energy store of the motor vehicle.

Degradation or limitation of the power which can be supplied or output by the internal combustion engine for a fixed predetermined period of time is also unfavorable in cases in which, in the case of a motor vehicle in the form of a hybrid vehicle, the internal combustion engine is started up for a short period of time. Such a start-up can take place, for example, when the electric drive of the hybrid vehicle requires assistance from an internal combustion engine. In the case of such a start-up, it can be provided that the internal combustion engine is operated immediately after starting with the requested load in order to supply the assisting drive power. In the case of the hybrid vehicle, raising the load point of the internal combustion engine can be requested in order to charge the electrical energy store of the hybrid vehicle. Such operating modes of the internal combustion engine of the hybrid vehicle accordingly result in a relatively high power request immediately after the starting of the internal combustion engine.

It is also disadvantageous in such cases if the power to be supplied by the internal combustion engine is limited after the starting of the internal combustion engine for a certain fixed period of time in order to comply with emissions threshold values. It is therefore also advantageous in the case of such uses of the internal combustion engine if the limitation of the power is not predetermined in a fixed fashion or hard-coded, and instead the release of power by the internal combustion engine is oriented according to the actual state of the catalytic converter. This is the case in the method described herein because the power which can be supplied by the internal combustion engine is set as a function of the respective size of the partial volume which effects the conversion of the at least one pollutant.

The method thus enables reliable controlling of the emissions of the at least one pollutant contained in the exhaust gas, and to be precise, in all possible combinations of a cold start of the internal combustion engine or a start-up of the internal combustion engine when the motor vehicle takes the form of a hybrid vehicle. This is also true for idling amounts of different lengths after starting the internal combustion engine, and in terms of the respective load requests to the internal combustion engine by a user or driver of the motor vehicle.

It is thus possible both for relatively high powers to be supplied very early by the internal combustion engine and to comply with emissions threshold values easily and reliably.

A temperature of the exhaust gas flowing through the at least one catalytic converter is preferably taken into account in order to calculate the respective size of the partial volume which effects the conversion of the at least one pollutant. Based on the temperature of the exhaust gas flowing through the at least one catalytic converter, a temperature of the catalytic converter and in particular of the already activated partial volume of the catalytic converter can be deduced very easily. The respective size of the already activated partial volume of the at least one catalytic converter can consequently thus be calculated particularly simply.

The temperature of the at least one catalytic converter or of the exhaust gas flowing through the at least one catalytic converter can be detected via at least one temperature sensor. Additionally or alternatively, the temperature of the exhaust gas flowing through the at least one catalytic converter or of the catalytic converter can be determined on the basis of a model of the exhaust gas temperature as a function of the respective operating mode of the internal combustion engine, in order to use this temperature in order to calculate the respective size of the partial volume.

A current conversion capacity of the at least one catalytic converter for the at least one pollutant is preferably calculated based on a space velocity, relative to the respective size of the partial volume, of the exhaust gas flowing through the at least one catalytic converter. This is based on the recognition that the space velocity relative to the already active or activated partial volume of the catalytic converter plays a role in the extent to which the at least one pollutant can be converted by means of the catalytic converter. In the case of a specific exhaust gas flow rate through the at least one catalytic converter, the space velocity relative to the size of the already activated partial volume of the catalytic converter is namely lower the larger the partial volume. The space velocity relative to the already activated or active volume of the catalytic converter is therefore particularly suited to determining the conversion capacity of the catalytic converter for the at least one pollutant. In addition, this space velocity is readily available in the motor vehicle, for example by using a space velocity model.

The current conversion capacity of the at least one catalytic converter is preferably compared with a target conversion capacity for the at least one pollutant. In this way, it is possible to determine very simply and reliably what power should be supplied by the internal combustion engine in order to achieve a desired conversion of the at least one pollutant.

A lower power than the maximum power of the internal combustion engine is preferably set as the power which can be supplied by the internal combustion engine when the current conversion capacity is less than the target conversion capacity. It is thus possible to reliably prevent the overrun of the at least one catalytic converter such that instead a desired minimum conversion for the at least one pollutant is achieved during operation of the internal combustion engine. It can in particular be ensured in this way that respective threshold values for emissions of the at least one pollutant into the surroundings of the motor vehicle are reliably complied with.

A total quantity of the at least one pollutant emitted into the surroundings of the motor vehicle is preferably taken into account for setting the power which can be supplied by the internal combustion engine. It can be ensured as a result not only that a threshold value for the at least one pollutant relative to a kilometer traveled by the motor vehicle is complied with, but also that a total budget for pollutants emitted when driving is not exceeded. Consequently, requirements to comply with emissions threshold values can be met to a particularly large extent.

The maximum power of the internal combustion engine is preferably set as the power which can be supplied by the internal combustion engine despite the fact that the current conversion capacity of the at least one catalytic converter is less than the target conversion capacity. This preferably takes place when the total quantity of the at least one pollutant emitted into the surroundings when the motor vehicle is driving is less than a threshold value of the total quantity.

In this way it is in particular possible to release a particularly high power of the internal combustion engine in the short term, while observing the threshold value of the total quantity. Taking into account the total quantity of the at least one pollutant emitted when the motor vehicle is driving makes it possible to allow an emissions threshold value for the at least one pollutant to be exceeded in the short term. Load requirements on the internal combustion engine which exist in certain in particular critical situations can advantageously be fulfilled.

Engine-out emissions of the at least one pollutant, caused by the internal combustion engine, which occur in the case of at least one predetermined driving maneuver of the motor vehicle when the motor vehicle is being driven are preferably taken into account in order to calculate a target conversion capacity of the at least one catalytic converter. Because the at least one driving maneuver is considered in order to calculate the target conversion capacity, in particular worst-case scenarios can be used when specifying the target conversion capacity or desired minimum conversion. This advantageously makes the method resilient and reliable.

For example, acceleration of the motor vehicle under full load up to a permissible maximum speed when the motor vehicle is being driven can be used as the at least one predetermined driving maneuver. By taking into account such a worst-case scenario, compliance with threshold values of the emission of the at least one pollutant can also be achieved as a result.

Lastly, it has been shown to be advantageous if, in the case of an increase in the size of the partial volume which effects the conversion of the at least one pollutant, a higher and higher power of the internal combustion engine is released as the power which can be supplied. The released power of the internal combustion engine can thus be increased gradually with a higher activated catalytic volume of the at least one catalytic converter. This is advantageous in particular in terms of a pleasant driving experience when the motor vehicle is being driven.

The motor vehicle according to the disclosure has an internal combustion engine and at least one catalytic converter arranged in an exhaust system of the motor vehicle and to which exhaust gas of the internal combustion engine can be fed. A control device of the motor vehicle is designed to set a power which can be supplied by the internal combustion engine as a function of an emission of at least one pollutant contained in the exhaust gas into the surroundings of the motor vehicle. The control device is further designed to calculate the size of a partial volume, effecting the conversion of the at least one pollutant, of the at least one catalytic converter and to set the power which can be supplied by the internal combustion engine as a function of the respective size of the partial volume.

The motor vehicle is consequently designed to perform the method according to the disclosure. It is accordingly possible with the motor vehicle to release a certain power output of the internal combustion engine relatively early and nevertheless to reliably comply with emissions threshold values.

The advantages described for the method according to the disclosure and preferred embodiments also apply to the motor vehicle according to the disclosure, and vice versa.

Further features of the disclosure can be found in the claims, the Figures, and the description of the Figures. The features and combinations of features mentioned above in the description, as well as the features and combinations of features mentioned below in the description of the Figures and/or shown individually in the Figures can be used not only in the combination stated in each case, but also in other combinations, or individually.

BRIEF DESCRIPTION OF THE DRAWINGS

The disclosure will now be explained in detail on the basis of preferred exemplary embodiments and with reference to the drawings.

DETAILED DESCRIPTION OF THE DRAWINGS

Figure 1:
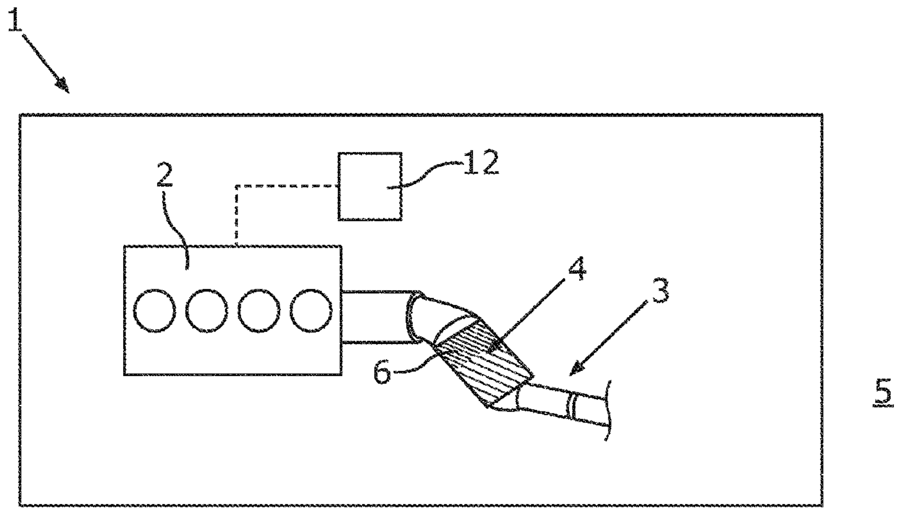
FIG. 1 shows a schematic illustration of a motor vehicle in which a control device makes a release of power from an internal combustion engine of the motor vehicle as a function of an activated catalytic volume of a catalytic converter of the motor vehicle.

A motor vehicle 1, which has an internal combustion engine 2, is illustrated in highly schematic form in FIG. 1. Exhaust gas from the internal combustion engine 2 is introduced into an exhaust system 3 of the motor vehicle 1, which exhaust system is shown only in a highly schematic form and partially in FIG. 1. At least one catalytic converter 4 is arranged in the exhaust system 3.

After a cold start of the internal combustion engine 2, high engine-out emissions are present and the catalytic converter 4 at the same time has a very low or no conversion capacity. In order to prevent the emission of unconverted pollutants into surroundings 5 of the motor vehicle 1 in such a case, the power of the internal combustion engine 2 may be limited. This can happen by a torque output or supplied by the internal combustion engine, and a speed of the internal combustion engine 2 being capped or limited for a predetermined period of time. Such a method is, however, rigid and not flexible.

In the present case, a conversion capacity of the catalytic converter 4 is therefore taken into account for a release of power from the internal combustion engine 2. An exhaust gas temperature model and a space velocity model can be used for this purpose. For example, it is possible to determine with the aid of the exhaust gas temperature model how much of the catalytic volume of the catalytic converter 4 has already been activated at a certain point in time (t). Conversion of at least one pollutant which is contained in the exhaust gas of the internal combustion engine 2 is effected via the already activated volume of the catalytic converter 4.

A situation in which at least a small partial volume 6 of the catalytic converter 4 has already been activated is illustrated, for example, in FIG. 1. This activated or active partial volume 6 of the catalytic converter 4 thus effects the conversion of the at least one pollutant. The catalytic converter 4 can have, for example, a total volume of three liters, and the already activated partial volume 6 which effects the conversion of the at least one pollutant can be one liter. This partial volume 6 of the catalytic converter 4 consequently results in pollutants being converted to a significant extent. In contrast, the remaining volume of the catalytic converter 4, in the example chosen i.e. the two-liter volume, does not yet contribute, or at least not yet to a significant extent, to conversion of the at least one pollutant.

Taking into account the space velocity model, a maximum allowed or maximum permissible power of the internal combustion engine 2 can be determined with respect to the catalytic volume or partial volume 6 activated in each case. This maximum permissible power of the internal combustion engine 2 must be output by the internal combustion engine 2 in order to convert the at least one pollutant released by the internal combustion engine 2 to a desired extent via the activated catalytic volume, i.e. via the partial volume 6. In this way it can in particular be achieved that a limitation of the torque of the internal combustion engine 2 and of the speed of the internal combustion engine 2 is reduced gradually, and to be precise, as a function of the catalytic volume already activated at the respective point in time (t), i.e., as a function of the respective size of the partial volume 6.

In particular by taking into account the exhaust gas temperature model and the space velocity model for this purpose, emissions of the internal combustion engine 2 can be converted reliably, and to be precise, in the case of different combinations of cold starts of the internal combustion engine 2 and/or start-ups of the internal combustion engine 2. Such start-ups of the internal combustion engine 2 can be provided if the motor vehicle 1 takes the form of a hybrid vehicle in a manner not shown in detail in this document, which has at least one electric drive motor for moving the motor vehicle 1 in addition to the internal combustion engine 2.

Figure 2:
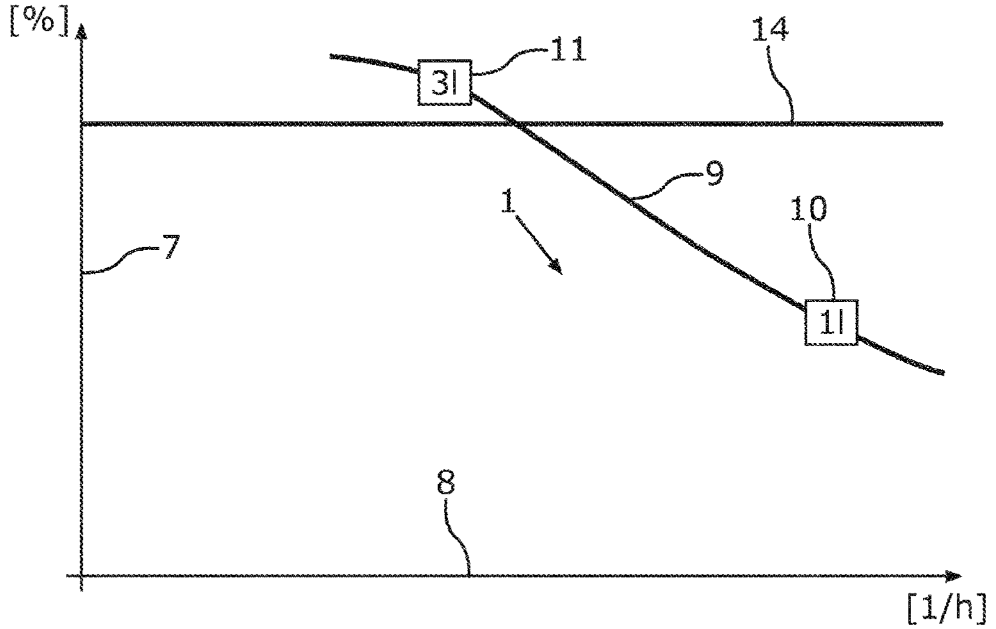
FIG. 2 shows a curve which indicates a conversion rate for a pollutant contained in the exhaust gas of the internal combustion engine of the motor vehicle as a function of the space velocity relative to the active catalytic volume of the catalytic converter; and, FIG. 3 shows schematically functional blocks in a method for the emissions-based release of power from the internal combustion engine of the motor vehicle.

A space velocity model which can be used in the operation of the motor vehicle 1 will be illustrated by way of example on the basis of FIG. 2. Thus, in the coordinate system in FIG. 2, conversion of a pollutant in percent is plotted on a vertical axis 7, and the space velocity of the exhaust gas flowing through the activated partial volume 6 of the catalytic converter 4 on a horizontal axis 8. If a corresponding flow of exhaust gas in cubic meters per hour [m3/h] is specified, and the volume of the catalytic converter 4 which is active at a respective point in time (t), and correspondingly the partial volume 6, likewise in cubic meters [m3], this gives a unit h−1 for the space velocity.

In FIG. 2, a curve 9 illustrates the conversion of at least one pollutant by means of the activated partial volume 6 of the catalytic converter 4. Accordingly, the space velocity relative to the active volume or the activated partial volume 6 decreases with the greater the partial volume 6. For example, a situation in which the size of the activated partial volume 6 is one liter is illustrated in FIG. 2 by a first label 10 along the curve 9. Accordingly, in the case of a size of the partial volume 6 of one liter, a relatively high space velocity relative to this active volume of the catalytic converter 4 is present.

Furthermore, a situation in which the total volume of the catalytic converter 4, for example, therefore the whole three liters of the catalytic converter 4, is activated is illustrated by way of example in FIG. 2 along the curve 9 by a further label 11 which is arranged on the curve 9 in the same way as the label 10. Accordingly, the activated partial volume 6 of the catalytic converter 4 is then the same as the total volume of the catalytic converter 4. When the total volume of the catalytic converter 4 is active, according to the curve 9, a correspondingly lower space velocity relative to the activated or active volume results.

It can furthermore be seen in FIG. 2 that a high space velocity relative to the active volume or the size of the activated partial volume 6 entails a lower conversion rate than is the case with a larger partial volume 6. Thus, the situation indicated by the second label 11 corresponds to a significantly higher conversion of the at least one pollutant.

The corresponding relationships are used in the present case by a control device 12 (illustrated generally in FIG. 1) of the motor device 1 which effects a respective release of power from the internal combustion engine 2. The control device 12 in the present case sets the power which can be supplied or output by the internal combustion engine 2 on the basis of emissions. The control device 12 may comprise a controller or processor configured to execute software or protocols stored in a memory.

An example of implementation of a method for operating the internal combustion engine 2 of the motor vehicle 1 will be explained on the basis of FIG. 3. Accordingly, a conversion model 13, which comprises the space velocity model explained with reference to FIG. 2, in the case of the catalytic volume of the catalytic converter 4 which is activated in each case, can be stored in the control device 12. In addition, a request for the conversion, to be performed by the catalytic converter 4, of the at least one pollutant is taken into account by the control device 12.

A minimum conversion to be performed by the catalytic converter 4 is indicated, for example, in FIG. 2 by a horizontal line. Accordingly, the horizontal line shown by way of example in FIG. 2 can indicate a target conversion capacity 14 of the catalytic converter 4 for the at least one pollutant considered. Engine characteristic maps 16 which specify the engine-out emissions of the internal combustion engine 2 for a certain power output of the internal combustion engine 2 can, for example, be used in order to determine the minimum conversion 15 (see FIG. 3) corresponding to this target conversion capacity 14.

Furthermore, a proportion of unconverted accumulated emissions can be calculated by taking into account the exhaust gas mass flow and on the basis of the exhaust gas temperature model. A request for the minimum conversion 15 can be derived from these variables. The exhaust gas temperature model which supplies the size of the already activated volume of the catalytic converter 4, i.e., the size of the partial volume 6, is illustrated in FIG. 3 by a functional block 17. As a further input variable 18, in the present case, it is also preferably taken into account what load request is made to the internal combustion engine 2.

When only the internal combustion engine 2 is provided for powering the motor vehicle 1, this load requirement can be calculated, for example, from a position of the accelerator pedal of the motor vehicle 1 which is actuated by the driver of the motor vehicle 1. When the motor vehicle 1 takes the form of a hybrid vehicle, the input variable 18 can be the result of a load requirement for assisting the electric drive motor and/or of a load requirement for charging an electrical energy store (not shown) of the motor vehicle 1.

Figure 3:
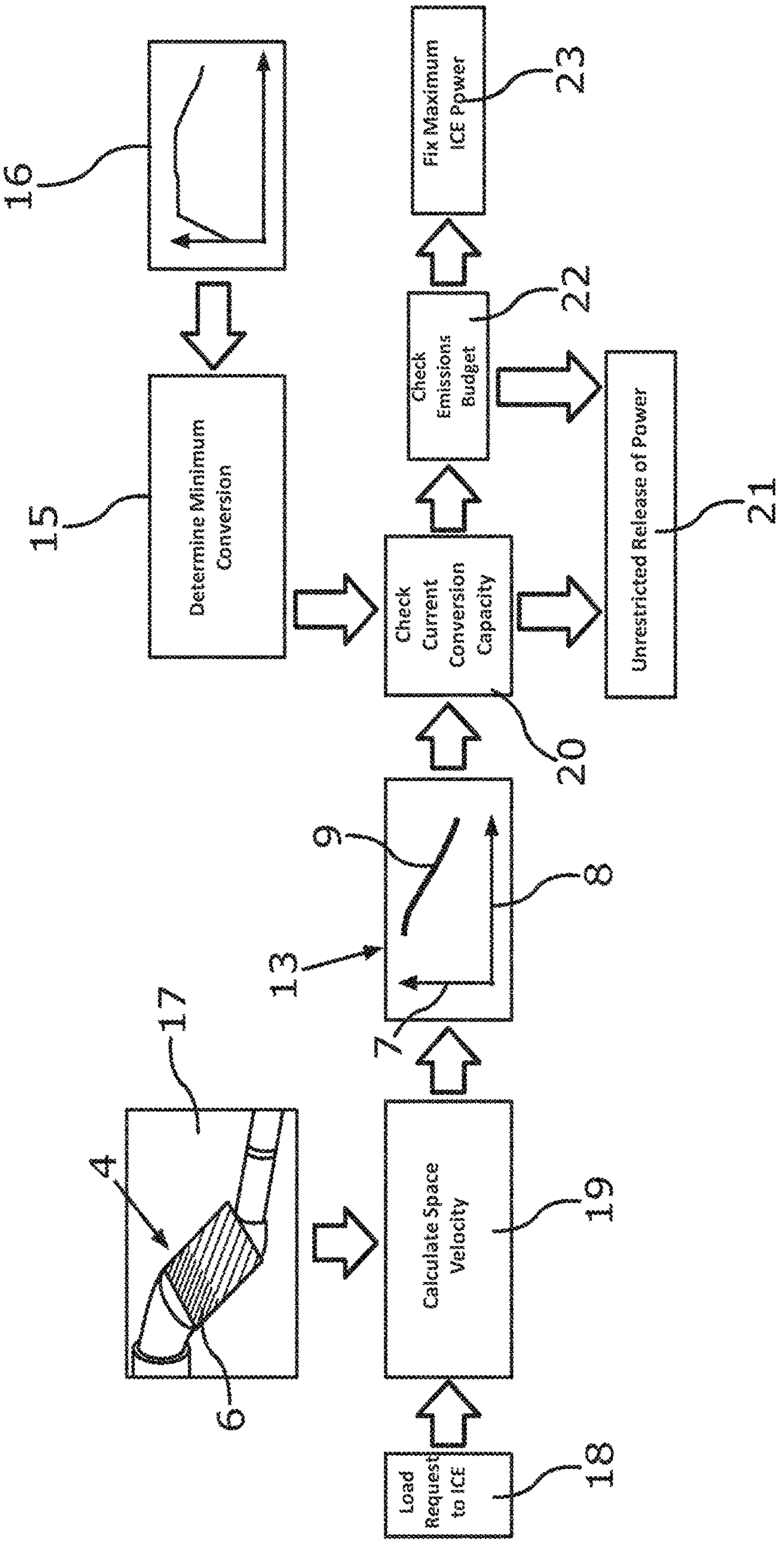

The space velocity 19 relative to the size of the activated partial volume 6 is calculated according to FIG. 3 in a next step, based on the volume flow of the exhaust gas or on the mass flow of the exhaust gas as a function of the input variable 18. This space velocity 19 relative to the size of the partial volume 6 is in turn input into the conversion model 13.

By taking into account the minimum conversion 15, in a further step 20 of the method illustrated schematically in FIG. 3, a check is made as to whether a current conversion capacity of the catalytic converter 4, i.e., an actual conversion which can be achieved via the activated partial volume 6 of the catalytic converter 4, is greater than or equal to the minimum conversion 15. If this is the case, an unrestricted release of power 12 from the internal combustion engine 2 can be effected by the control device 12.

It can, however, be the case that the current conversion capacity of the catalytic converter 4, i.e., the actual conversion which can be achieved by means of the activated partial volume 6, is less than the minimum conversion 15 and hence the actual conversion is less than the target conversion capacity 14 (see FIG. 2). In such a case, it is possible for a check to be made in a further step 22 of the method as to whether there is still an emissions budget for driving with the motor vehicle 1. Accordingly, the total quantity of the at least one pollutant which is emitted into the surroundings 5 of the motor vehicle 1 when the motor vehicle 1 is being driven can be taken into account as part of the method explained by way of example with the aid of FIG. 3. If there is still an emissions budget, the control device 12 can nevertheless authorize the unrestricted release of power 21. According to FIG. 3, it is thus possible, despite falling below the minimum conversion 15, for a result of the check performed in the step 22 to be that the unrestricted release of power 21 is performed.

The method can furthermore reach a result 23 in which the power, released by the control device 12, of the internal combustion engine 2, i.e., the maximum allowed power of the internal combustion engine 2, is fixed as a function of the space velocity 19 and the size of the partial volume 6. This can be the case, for example, when the check in the step 22 has the result that there is no more emissions budget for driving with the motor vehicle 1.

The control device 12 can, in a variant of the method which is not shown explicitly in the present case, reach this result 23 when the check in the step 20 has the result that the current conversion capacity of the catalytic converter 4, i.e., the conversion of the catalytic converter 4 which can be achieved by means of the activated partial volume 6, is less than the desired minimum conversion 15. In this method, the step 22 can therefore be missing or be omitted.

The method will be illustrated below again on the basis of a numerical example. For example, the activated or active partial volume 6 can be one liter, wherein the total volume of the catalytic converter 4 is three liters. The minimum conversion 15, i.e., the requirement for the conversion of at least one pollutant in order to comply with a threshold value of this pollutant, can be 95%. The space velocity model determines, from this minimum conversion 15 of for example 95%, a maximum permissible space velocity which results in no overrun of the catalytic converter 4, and instead the catalytic converter 4 fulfills the requirements for the minimum conversion 15. For example, the maximum permissible space velocity determined in this way can be 100,000 h−1.

Because the space velocity 19 can be determined as a quotient of the exhaust gas mass flow or the exhaust gas volume flow relative to the activated catalytic volume of the catalytic converter 4, the permissible exhaust gas mass flow can also be calculated which has to be released by the internal combustion engine 2 during the operation thereof in order to achieve the minimum conversion 15 of 95%. Accordingly, the power which can be supplied by the internal combustion engine 2 can be calculated by the control device 12, i.e., the power of the internal combustion engine 2 which is permissible taking into account the emissions output into the surroundings 5 of the motor vehicle 1.

The higher the activated catalytic volume of the catalytic converter 4, i.e., the more the size of the partial volume 6 increases, the more the power released by the internal combustion engine, i.e., the power which can be supplied by the internal combustion engine 2 of the motor vehicle 1, can also be gradually increased, and to be precise, while complying with the emissions threshold value for the at least one pollutant.

As a whole, the examples show how an improved emissions-based power control of the internal combustion engine can be implemented.

LIST OF REFERENCE SIGNS

1 motor vehicle
2 internal combustion engine
3 exhaust system
4 catalytic converter
5 surroundings
6 partial volume
7 vertical axis

8 horizontal axis
9 curve
10 label
11 label
12 control device
13 conversion model
14 target conversion capacity
15 minimum conversion
16 engine characteristic map
17 functional block
18 input variable
19 space velocity
20 step
21 release of power
22 step
23 result

What is claimed is:

1. A method for operating an internal combustion engine of a motor vehicle in which exhaust gas is fed to at least one catalytic converter arranged in an exhaust system of the motor vehicle, the method comprising:

setting a power which can be supplied by the internal combustion engine as a function of an emission of at least one pollutant contained in the exhaust gas into the surroundings of the motor vehicle, and calculating a size of a partial activated volume of the at least one catalytic converter, wherein the partial activated volume has reached a minimum activation temperature to effectuate a minimum conversion of the at least one pollutant, wherein a maximum power which can be supplied by the internal combustion engine is increased in response to an increase in the respective size of the partial activated volume; and, wherein the maximum power which can be supplied by the internal combustion engine is increased in response to an increase in a temperature of the exhaust gas flowing through the at least one catalytic converter.

2. The method according to claim 1, comprising at least one temperature sensor for measuring the temperature of the exhaust gas flowing through the at least one catalytic converter.

3. The method according to claim 1, wherein the maximum power which can be supplied by the internal combustion engine is increased in response to a decrease in a space velocity, relative to the respective size of the partial activated volume, of the exhaust gas flowing through the at least one catalytic converter.

4. The method according to claim 3, wherein a current conversion capacity of the at least one catalytic converter is compared with a target conversion capacity for the at least one pollutant.

5. The method according to claim 4, wherein a lower power than the absolute maximum power of the internal combustion engine is set as the maximum power which can be supplied by the internal combustion engine when the current conversion capacity is less than the target conversion capacity.

6. The method according to claim 4, wherein when, based on predetermined engine characteristic maps, a total quantity of the at least one pollutant emitted into the surroundings of the motor vehicle is less than a threshold value, the maximum power which can be supplied by the internal combustion engine is increased, despite the fact that the current conversion capacity of the at least one catalytic converter is less than the target conversion capacity.

7. The method according to claim 6, wherein the absolute maximum power of the internal combustion engine is set as the power which can be supplied by the internal combustion engine despite the fact that the current conversion capacity of the at least one catalytic converter is less than the target conversion capacity when the total quantity of the at least one pollutant emitted into the surroundings when the motor vehicle is being driven is less than a threshold value of the total quantity.

8. The method according to claim 1, wherein, based on predetermined engine characteristic maps, engine-out emissions of the at least one pollutant, caused by the internal combustion engine, which occur in the case of at least one predetermined driving maneuver of the motor vehicle when the motor vehicle is being driven, are utilized to set a target conversion capacity of the at least one catalytic converter.

9. A motor vehicle comprising:

an internal combustion engine with at least one catalytic converter arranged in an exhaust system of the motor vehicle to which exhaust gas of the internal combustion engine can be fed, a control device configured to set a maximum power which can be supplied by the internal combustion engine as a function of an emission of at least one pollutant contained in the exhaust gas into the surroundings of the motor vehicle, and at least one temperature sensor for measuring a temperature of the exhaust gas flowing through the at least one catalytic converter, wherein the control device is configured to calculate the size of a partial activated volume of the at least one catalytic converter, wherein the partial activated volume has reached a minimum activation temperature to effectuate a minimum conversion of the at least one pollutant, and increase the maximum power which can be supplied by the internal combustion engine in response to an increase in the size of the partial activated volume, and in response to an increase in the temperature of the exhaust gas flowing through the at least one catalytic converter.

* * * * *